United States Patent [19]

Fontana, Jr. et al.

[11] Patent Number: 5,745,979
[45] Date of Patent: May 5, 1998

[54] MAGNETIC HEAD FOR RECORDING WITH ULTRA LOW FORCE

[75] Inventors: Robert Edward Fontana, Jr., San Jose; Linda Hope Lane, Gilroy; Mason Lamar Williams, III; Celia Elizabeth Yeack-Scranton, both of San Jose, all of Calif.

[73] Assignee: International Business Machines Corporation, Armonk, N.Y.

[21] Appl. No.: 548,767

[22] Filed: Oct. 26, 1995

Related U.S. Application Data

[62] Division of Ser. No. 259,370, Jun. 14, 1994, which is a continuation of Ser. No. 935,000, Aug. 25, 1992, abandoned.

[51] Int. Cl.$^6$ .................................................. G11B 5/42
[52] U.S. Cl. .......................... 29/603.12; 29/603.14; 29/603.15; 29/603.06
[58] Field of Search ....................... 29/603.12, 603.13, 29/603.14, 603.15, 603.04, 603.05, 603.06; 360/103, 104

[56] References Cited

U.S. PATENT DOCUMENTS

| | | | |
|---|---|---|---|
| 3,849,800 | 11/1974 | Cuzner et al. | 360/97 |
| 3,975,772 | 8/1976 | Lin | 360/113 |
| 4,190,872 | 2/1980 | Jones, Jr. et al. | 360/125 |
| 4,251,841 | 2/1981 | Jacobs | 360/122 |
| 4,305,102 | 12/1981 | Suzuki | 29/603.06 |
| 4,546,541 | 10/1985 | Reid | 29/603.15 |
| 4,624,048 | 11/1986 | Hinkel et al. | 29/603 |
| 4,670,804 | 6/1987 | Kant et al. | 360/102 |
| 4,700,250 | 10/1987 | Kuriyama | 29/603.06 |
| 4,789,914 | 12/1988 | Ainslie et al. | 360/103 |
| 4,939,837 | 7/1990 | Krounbi | 29/603.15 |
| 5,014,145 | 5/1991 | Hosokawa et al. | 360/104 |
| 5,041,932 | 8/1991 | Hamilton | 360/104 |
| 5,055,969 | 10/1991 | Putnam | 361/398 |
| 5,200,056 | 4/1993 | Cohen et al. | 29/603.15 |

FOREIGN PATENT DOCUMENTS

| | | | |
|---|---|---|---|
| 0 179 653 A1 | 10/1985 | European Pat. Off. | G11B 5/31 |
| 0 430 407 A2 | 9/1990 | European Pat. Off. | G11B 5/48 |
| 0 508 565 A3 | 2/1992 | European Pat. Off. | G11B 5/48 |
| 0 540 282 A2 | 10/1992 | European Pat. Off. | G11B 5/31 |
| 59-168968 | 9/1984 | Japan | G11B 17/32 |
| 4-289508 | 10/1992 | Japan | G11B 5/31 |
| 86 00456 | 6/1985 | WIPO | G11B 5/31 |

OTHER PUBLICATIONS

H. Hamilton et al. "Contact Perpendicular Recording on Rigid Media", *IEEE Transactions on Magnetics*, vol. 27, No. 6, Pt. 2, Nov. 1991, pp. 4921–4926.

(List continued on next page.)

*Primary Examiner*—Carl E. Hall
*Attorney, Agent, or Firm*—Baker, Maxham, Jester & Meador

[57] ABSTRACT

A disk drive assembly in which the suspension and read/write transducer are integrated into a combination assembly and fabricated using thin film deposition techniques thereby producing an assembly which is very low in mass permitting contact recording. In one embodiment, transducers are deposited in a row and column configuration onto a release and support layer covering a wafer substrate having a thickness equal to a desired suspension length. The wafer is separated into a plurality of row sections, with each row section providing one thin film transducer from each column. A second release layer is formed on a separated side on the row section and thin layers of suitable materials are deposited to form a suspension layer including conductive lines extending to the thin film transducers. The first and second release layers are dissolved and the row section is further cut to form the individual combination assemblies. In a second embodiment, the wafer substrate has a thickness equal to the width of the suspension. The transducers deposited on a row are separated by the desired suspension length to produce combination assemblies useful for linear disk drive actuators. The excess portion of the wafer substrate can alternatively be removed by cutting or etching eliminating the requirement for release or support layers.

51 Claims, 7 Drawing Sheets

OTHER PUBLICATIONS

T. J. Beaulieu & D. W. Chapman, "Vertical Recording Probe Head Made By Horizontal Head Process", *IBM Technical Disclosure Bulletin*, vol. 36, No. 02, Feb. 1993, pp. 267–268.

Daniel W. Chapman, "A New Approach to Making Thin Film Head–Slider Devices", *IEEE Transactions on Magnetics*, vol. 25, No. 5, Sep. 1989, pp. 3686–3688.

Daniel W. Chapman et al., "A New, Horizontal MR Head Structure", *IEEE Transactions on Magnetics*, vol. 25, No. 5, Sep. 1989, pp. 3689–3691.

MAGNETIC HEAD FOR RECORDING WITH ULTRA LOW FORCE

CROSS REFERENCE TO RELATED APPLICATION

This application is a division of application Ser. No. 08/259,370 filed Jun. 14, 1994, which is a continuation of abandoned application Ser. No. 07/935,000 filed Aug. 25, 1992, abandoned.

DOCUMENTS INCORPORATED BY REFERENCE

Jones Jr. et al, U.S. Pat. No. 4,190,872, issued on Feb. 26, 1980 and assigned to the assignee of the present invention, to show a thin film inductive transducer useful with the present invention.

Lin, U.S. Pat. No. 3,975,772 issued on Aug. 17, 1976 and assigned to the assignee of the present invention, to show a thin film magnetoresistive head useful with the present invention.

Hinkel et al, U.S. Pat. No. 4,624,048, issued on Nov. 25, 1986 and assigned to the assignee of the present invention, to show a process for making magnetic head sliders useful with the present invention.

Jacobs, U.S. Pat. No. 4,251,841, issued on Feb. 17, 1981 and assigned to the assignee of the present invention, to show a wafer-substrate material useful with the present invention.

Cuzner, et al, U.S. Pat. No. 3,849,800, issued on Nov. 19, 1974 and assigned to the assignee of the present invention, to show a rotary actuator useful in a drive using the present invention.

TECHNICAL FIELD

The present invention relates to moving magnetic storage devices and their recording elements and more particularly to combination transducer-suspension structures which are suitable for batch fabrication and a method for making the structures.

BACKGROUND OF THE INVENTION

The quest for an efficient recording scheme for disk files continues to be one of the highest priorities. Increasing data storage density and the need for apparatus having extended lives drive this search.

Disk files are information storage devices which utilize at least one rotatable data storage disk with concentric data tracks containing data information, a transducer for reading the data from or writing the data to the various tracks, a slider for holding the transducer adjacent to the track generally in a flying mode above the media, a suspension for resiliently holding the slider and the transducer over the tracks, and a positioning actuator connected to the combination for moving the transducer to the desired track and maintaining the transducer over the track center line during a read or a write operation. The transducer is attached to the air bearing slider which supports both above the track of the disk by a cushion of air that is generated by the rotating disk or in contact with the disk. A suspension provides a high spring stiffness and dimensional stability between the slider and the actuator arm. The suspension is required to maintain the transducer and the slider adjacent to the data surface of the disk with as low a loading force as possible. The actuator positions the transducer over the correct track according to the data desired on a read operation or to the correct track for placement of the data during a write operation. The actuator is controlled to position the transducer over the-correct track by shifting the combination suspension-transducer-slider assembly generally transverse to the motion of the track.

In conventional disk drives, the transducer and the slider are formed separately from the suspension and then attached through an operator controlled precision operation. The parts are small and the positioning of each relative to the other must be exact. The transducer must be exactly positioned relative to the track which in turn means that the suspension must be exactly positioned onto the slider. The suspension must provide flexibility and pitch and roll motion for the slider relative to the direction of motion of the rotating disk and yet provide resistance to yaw motion. Any error in the placement of the suspension relative to the slider results in the destruction of both pieces. The conductor leads are directed along the suspension and connected to an amplifier placed on the suspension or on the actuator. The conductor leads must not add to the spring stiffness of the slider while providing good electrical interconnection. The conductor leads are generally bonded by soldering, for instance, to both the transducer output leads and the amplifier by an operator. Again, errors can cause destruction of the entire combination.

The U.S. Pat. No. 4,670,804 to Kant et al. assigned to the assignee of the present invention, describes a slider-suspension assembly that includes flexible sheets of material for the suspension to which the conductors for the transducer are deposited and which support the slider and the transducer combination. The stainless steel suspension of the prior art is replaced by the flexible sheet onto which the conductors are deposited. In this patent, the polyimide flexible sheets are formed separately from the slider/transducer combination and then attached to each other by gluing, for instance. There is no showing of a combination transducer/slider/suspension assembly that requires no further connection step between the suspension and the slider.

It is known that the suspension arm can be formed from a polyimide material with the conductors to the transducer deposited directly on the polyimide suspension. U.S. Pat. No. 4,789,914 to Ainslie et al. and assigned to the assignee of the present invention, discloses that contact soldering can be used to connect the suspension containing the conductors directly to a slider. The transducer is already deposited on the slider. The slider includes conductor pads and interconnecting leads deposited on the slider between the conductor pads and the transducer. Again the slider and transducer are separately produced from the suspension arm and then interconnected later through contact soldering as disclosed in this patent. As with the remainder of the known prior art, the slider and transducer portion of the combination is produced separately from the suspension assembly which includes interconnecting conductors. There is no showing of a combination transducer/slider/suspension with conductors nor a method for making the combination.

Contact reading techniques have shown some great promise in recent years. Slider apparatus with a suspension made of an active material achieves contact recording by cycling the transducer down only when a read/write operation is desired. The remainder of the time the slider flies at a height above disk contact. Another approach to contact recording is a scheme in which a "flexible" head is rubbed against the disk surface. The head used in this approach is fabricated by building up a thin film of material on a substrate and then releasing the thin film. For example, U.S. Pat. No. 5,041,932 to Hamilton, assigned to Censtor Corp., discloses a low mass, integrated transducer/flexure/conductor structure for use in contact recording and reading of information.

However, the "flexible" head approach requires an elaborate mounting mechanism for proper and precise control.

It has been found that a vertical transducer head achieves several advantages; the most pronounced advantage is the fabrication of the head windings along the length of the wafer. This construction accommodates a large change in the pole tip length caused by mechanical wear over the life of the file and thereby increases the life of the overall apparatus.

Unfortunately, all of these schemes have associated with them several disadvantages which limit their use and application. It is estimated that there are 400 micro inches of head wear over a typical product life. This large amount of wear restricts the applicability of many of these approaches. The pole tips in a conventional head are usually only about one micron long and wear away rapidly in this application.

Additionally, while the thin film fabrication allows the integration of the head onto the suspension, this arrangement requires a large amount of wafer area which reduces the head yields per wafer to a level much below conventional head production processes and below an acceptable level.

It therefore is an object of the present invention to provide a disk system and especially a transducer and suspension system that overcomes the adversities of the prior art.

It is another object of the present invention to provide an enhanced suspension and transducer element.

Another object of the present invention is to provide a low mass suspension-transducer with decreased head wear characteristics.

Yet another object is to provide a suspension-transducer assembly which is useful for contact recording.

Still another object of the present invention is to produce a thin film suspension-transducer which can be controllably activated.

Another object is to provide a recording drive that uses a thin film suspension-transducer of the present invention.

SUMMARY OF THE INVENTION

The present invention provides a disk drive assembly in which the suspension system and transducer are integrated and fabricated using thin film deposition techniques. The thin film technique produces an assembly that is very low in mass thereby permitting a choice between flying or contact recording. The integrated transducer and suspension system is made by batch processing a plurality of transducers onto a substrate in a row and column configuration. A row section of the transducers is further batch processed by forming a combination slider-suspension on each transducer. The suspension section is formed onto each transducer of the substrate row section together with the conductors for each transducer. The supporting structure for the suspension section is removed by etching or cutting, or by the removal of a release layer deposited before the suspension section is formed. The suspension section is flexible while remaining connected to a slider and its transducer. Single transducer-suspension systems can then be produced by cutting or dicing the row section into the individual units.

In fabrication of one embodiment, a wafer substrate having a thickness equal to a desired suspension length has a first release layer formed thereon. Next, a support layer is formed on the first release layer and a plurality of thin film transducers is formed on the support layer in a row and column pattern. The wafer is separated into a plurality of row sections, with each row section having one transducer from each column which forms the row section of formed thin film transducers. A second release layer is formed on a separated side on the row section separated from the obtained wafer substrate with the thin film transducer. Next, a suspension layer is formed by depositing a thin film layer of a resilient material on the second release layer. Electrically conductive lines are formed extending from both coil ends of the thin film transducer to an opposing end, a free end, of the suspension layer. Finally, the first and second release layers are dissolved leaving the suspension/transducer assembly ready for use. The resulting apparatus allows the use of a conventional transducer on a very low mass, integrated slider-suspension assembly. The apparatus can be fabricated using well established slider technology and high density thin film head production. In a second embodiment, the thickness of the substrate is made equal to the desired width of the suspension section. The thin film transducers are then deposited onto the substrate with the release layer, again in a row and column configuration. In one row section, however, the transducers are separated by a distance which will become the length of the slider. The row section is separated from the wafer substrate and the suspension layers are deposited onto the proper side of the row section. The row section is then cut, etched, diced or machined to separate the individual transducer-suspensions and then separated from the substrate by dissolving the release layer. Instead of a release layer, the transducer and suspension layers can be directly deposited onto the substrate. The substrate is the abraded away as desired by etching or sawing. In this manner, a portion of the substrate may be left to serve as a slider support for the transducers.

BRIEF DESCRIPTION OF THE DRAWINGS

The foregoing, and other objects, features and advantages of the invention, will be apparent from the following more particular description of preferred embodiments of the invention, as illustrated by the accompanying drawings, wherein.

DETAILED DESCRIPTION OF THE PREFERRED EMBODIMENTS

The suspension system, slider and transducer of the present invention are integrated and fabricated using thin film deposition techniques which produce an assembly that is very low in mass. The preferred embodiments of the present invention are generally for use in the large multiple media drives but should also find use in the single media drives used generally for personal computers. The media can be either tape or disk.

A standard transducer is achieved in one embodiment by using the length of the suspension as the determining factor for the thickness of the starting wafer substrate. Additionally, the arm is optionally integrated into this structure and is capable of being modified to be active, thereby allowing dynamic loading and unloading from the disk only when contact is desired for reading/writing.

In this embodiment, a conventional transducer of well known construction is fabricated on a wafer substrate. An example of an process for fabricating a transducer on a wafer substrate useful for this application is described by the aforementioned U.S. Pat. No. 4,624,048. Transducers and associated mechanisms are well known in the art. The transducers are deposited on a relatively thick layer of alumina or other suitable material which is chosen for its ability to act as an etch stop and potential use as a slider section. Row sections are cut from the wafer and lapped to a desired measurement, a throat height for an inductive transducer, for instance. Alternatively, the measurement is defined through photolithography techniques. The top of the row sections are lapped to provide a smooth surface.

A layer of the etch stop material is deposited on the top of the row section. This step provides a bend of thick material which eventually serves as the suspension. A layer of electrically conductive material is deposited as part of the suspension and featured to provide electrodes leading from the transducer element to electronics which control the transducer element.

Another embodiment permits the depositing of a first ground plane layer before the conductor leads. A top ground plane layer provides greater stray field isolation and reduces symmetric stress due to thermal mismatches, both of which are desired in certain applications.

An etch process can be used to remove the substrate from the bulk of the slider-suspension, leaving only the suspension material and the transducer element with its associated leads. This provides an extremely lightweight suspension-transducer assembly. The removal of the substrate can be achieved through the use of release layers. The initial substrate is coated with a release layer so that the deposited films, as discussed above, are readily released at the final step. Still another approach is to grind or etch the appropriate thickness of material from the row section leaving the desired structure. Adapting the leads to "bend" around the corner to connect to the transducer can be accomplished using a variety of techniques. One approach is to terminate the electrodes so that in the grinding stage, the edges are exposed permitting subsequent deposition from the top to connect thereto. If the top edge of the transducer head surface is rounded, this task is facilitated. The suspension section is selectively stiffened by any of several techniques. Stiffening of the suspension may be desired in specific applications or to accommodate the dynamics of the system.

This stiffening is preferably accomplished by varying the thickness profile of the suspension itself. The variance in thickness adds little to the overall mass and provides highly controlled stiffening properties. Anisotropic stiffness is accomplished through the use of corrugations.

Recesses in the substrate also are used to define areas for automatic alignment with similarly shaped parts. This permits the number of transducer elements manufactured on a single wafer to be increased through the use of tiny chiplets. These chiplets are bonded onto the larger suspension and a recession in the shape of the chiplet is provided for automatic alignment of the chiplet to the suspension.

The low stiffness of the suspension assembly permits easy attachment to an actuator arm. To avoid any problem with stiction, the slider and transducer can be normally unloaded from contact with the disk by making the arm or the suspension section from an active material. The slider and its transducer are placed into contact with the disk at a desired force level by activating the active material.

Figure 1:
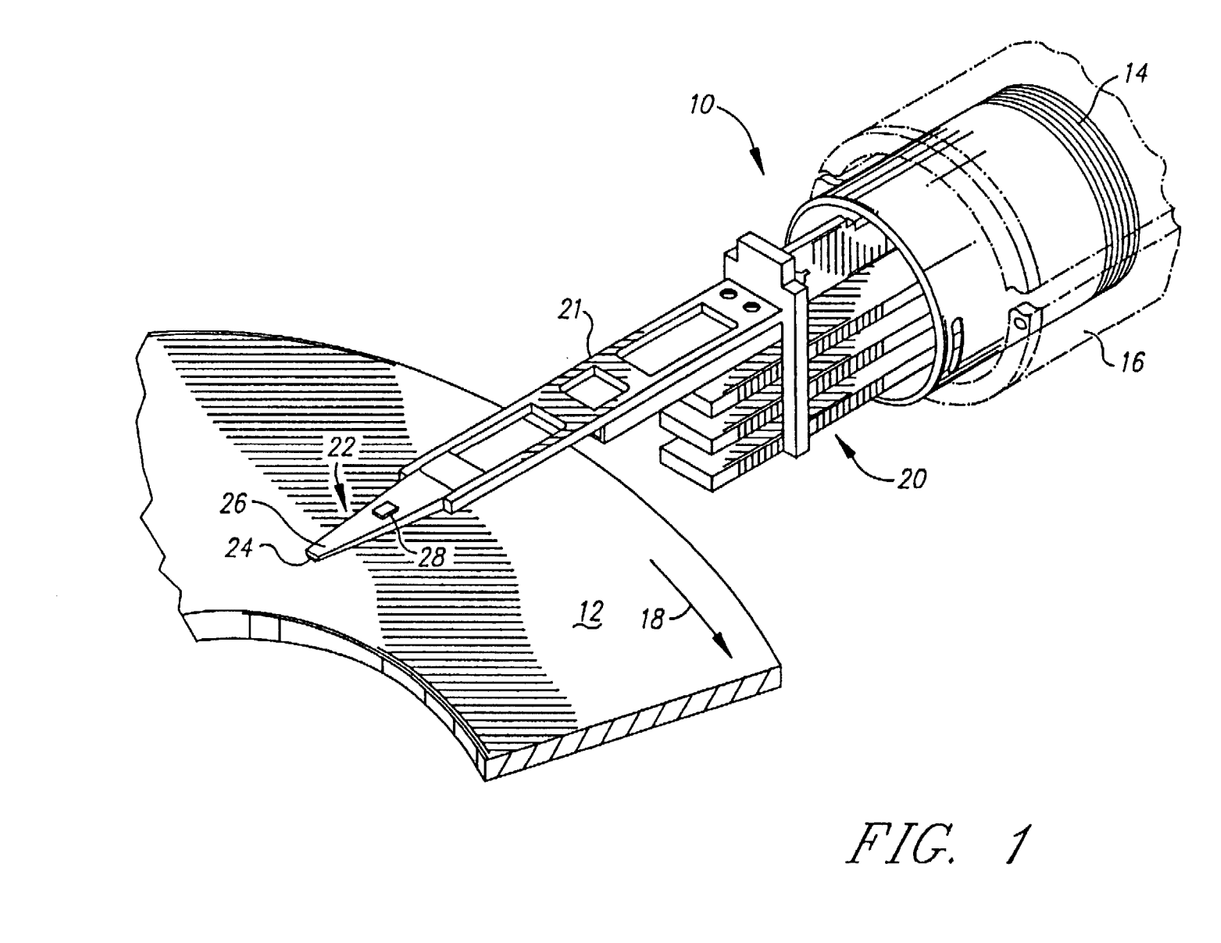
FIG. 1 is a perspective view of a combination assembly according to the present invention attached for positioning by an actuator in transducing relationship to a disk surface of a disk file.

Referring now to FIG. 1, a disk file system embodying the present invention comprising a linear actuator 10 and a segment of an associated disk 12 of a data recording disk file is illustrated. The linear actuator 10 includes a voice coil motor 14. The voice coil motor 14 includes a coil movable within the magnetic field of a fixed permanent magnet assembly (not shown) having a core and an outer structure supported by a housing 16. An actuator arm 20 is attached to the movable coil 14. Attached to the other end of the actuator arm 20 is a plurality of arms 21, each of which support a combination transducer-slider-suspension assembly 22 produced according to the procedure set forth herein. The assembly 22 includes a transducer-slicer 24 and a suspension section 26. The suspension section 26 can support the transducer-slider 24 above the surface of the disk 12 on a bearing or cushion of air generated by the rotation of the disk 12. If desired, the suspension section 26 can support the transducer-slider 24 in contact with the disk media. The air bearing or air bearing surface refers to the surface of the slider parallel and adjacent to the disk surface. It includes both configurations where the slider is designed to fly above the disk, and where the slider is designed to contact the surface of the recording media, the disk 12, during operation.

The actuator arm 20 includes a plurality of the arms 21 with each arm 21 supporting the combination assembly 22, each combination assembly 22 associated with each surface of the disk 12. Therefore, disk 12 also has a combination assembly 22 mounted to an arm 21 of the actuator arm 20 on the underside of the disk 12. Further, other combination assemblies are associated with the top and bottom sides of other disks, the transducer access of which is controlled by the actuator 10.

The suspension section 26 of the combination transducer-slider-suspension assembly 22 provides a load to the transducer-slider assembly 24 which is generally perpendicular to the surface of the disk 12. This perpendicular load maintains the transducer-slider assembly 24 in contact with the data surface of the disk 12 when the disk 12 is not rotating. During rotation of the disk 12, the air bearing generated between the transducer-slider assembly 24 and the disk 12 opposes the perpendicular load applied to the transducer-slider assembly 24 by the suspension section 26.

During operation, the transducer-slider assembly 24 is moved to the desired track of the concentric data tracks on the data surface of the disk 12 by activating the voice coil motor 14. Rapid transfer of the transducer-slider assembly 24 from one track to another track for read or write operations is required. It is necessary that the transducer of the assembly 24 be properly positioned over the desired track and reach that track in a minimum amount of time. The actuator 10 illustrated in FIG. 1 is a linear actuator which moves the combination assembly 22 in a precise direction transverse to the tracks. Other types of conventional disk files utilize a rotary actuator such as is shown in the aforementioned U.S. Pat. No. 3,849,800 and in FIG. 2. The rotary actuator moves the combination assembly of the present invention in an arcuate path which is only generally in the radial direction and is a substitute for the linear actuator 10.

The combination assembly 22 must provide radial stiffness, and have substantial flexibility in the pitch and roll directions as it rides on the air bearing above the data surface of the disk 12. If desired, an integrated circuit assembly 28 may also be produced on the suspension section 26 of the combination assembly 22. The integrated circuit amplifier is shown symbolically in reference numeral 28 and will be described as the description proceeds as a further embodiment of the present invention.

Figure 2:
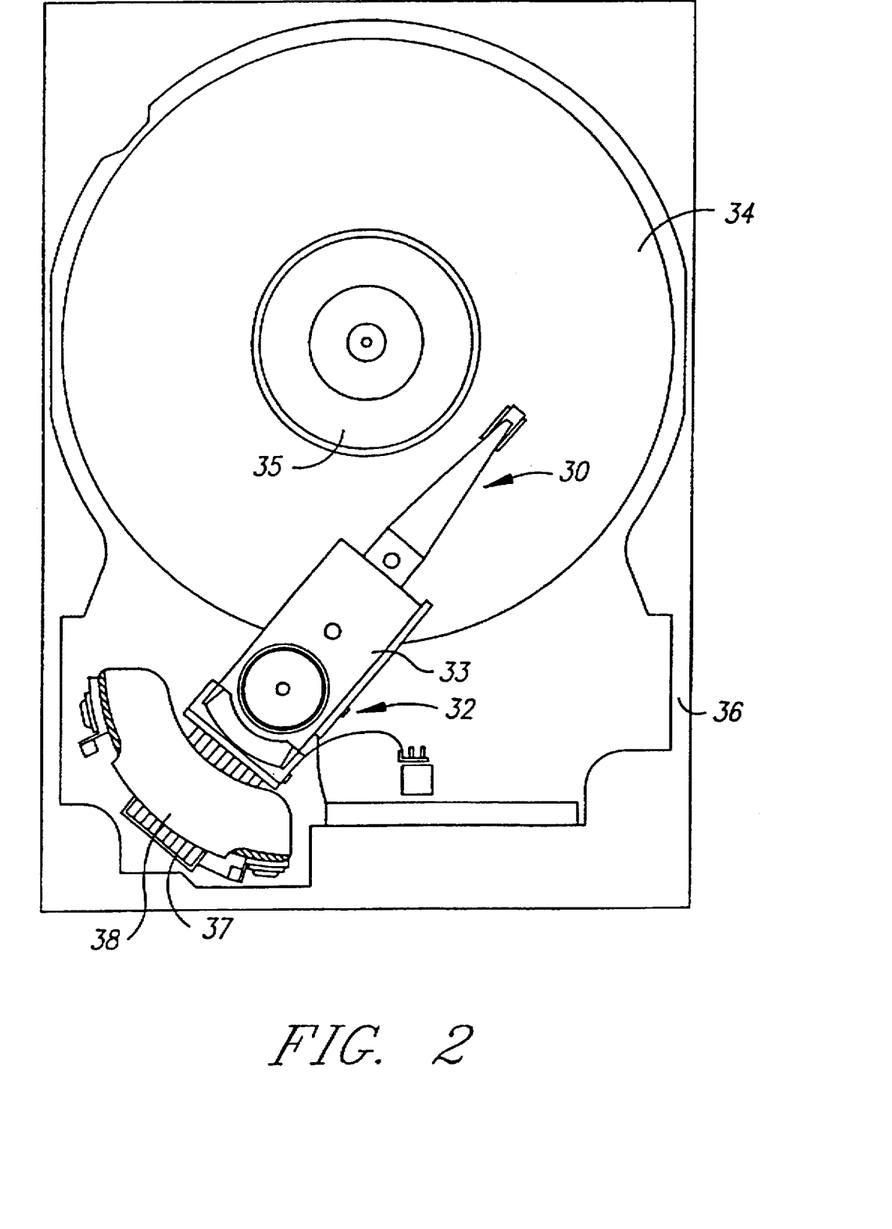
FIG. 2 is a top view of a magnetic recording mechanism with a rotary actuator and employing the present invention.

FIG. 2 illustrates a data recording disk file including a rotary actuator 32 and an associated disk 34 rotated by a drive means 35, all mounted within a housing 36. The rotary actuator 32 moves a combination assembly of the present invention in an arcuate path over the disk 34. The rotary actuator 32 includes a voice coil motor, which is a coil 37 movable within the magnetic field of a fixed permanent magnet assembly having a core 38. An actuator arm 33 is attached to the movable coil 37. The other end of the actuator arm 33 is attached to a combination transducer-suspension assembly 30 of the present invention and produced according to the procedure set forth herein.

Figure 3A:
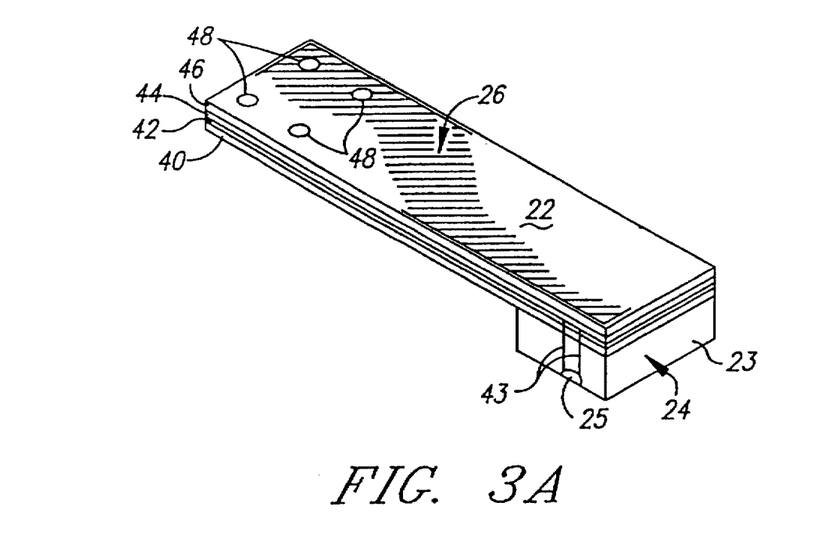
FIG. 3A is a perspective view of one embodiment of a combination transducer-suspension according to the invention for use as the combination assembly with the disk file as shown in FIG. 1.

An enlargement of the combination assembly 22 for use with the disk file of FIG. 1 is shown in FIG. 3A. The suspension section 26 is deposited over an entire section of a wafer as will be described later. A portion of the wafer becomes the slider 23 of the transducer-slider assembly 24. While one transducer 25 is shown formed on the slider 23, it is contemplated that more than one transducer may be formed and used for operation with the track of the disk 12. Generally, two or more transducers 25 are deposited in order to increase the yield since only one transducer 25 need be in operation to produce a workable combination assembly 22.

The suspension section 26 may include an insulation layer 40, a conductive circuitry layer 42, a dielectric layer 44, and a structural suspension layer 46. The structural suspension layer could be the dielectric layer 44, made of alumina for instance, or could be a separate dielectric layer, again of alumina, for instance. The structural suspension may also be made of a plated nickel-iron alloy, a sputtered beryllium copper layer, or a sputtered stainless steel layer. Conductor leads 43 interconnect the transducer 25 to the conductor circuitry layer 42. Electrical connection pads 48 are provided at the termination of the conductor circuitry layer 42 to interconnect with an external amplifier. The external amplifier could be an integrated circuit amplifier, such as integrated circuit amplifier 28, (see FIG. 1), which can be deposited together with other layers that are used in the suspension section 26. The insulation layer 40 provides electrical insulation between the conductor layer 42 and the possibly conductive substrate of the slider 23. The dielectric layer 44 provides insulation for the conductive circuit 42 from the metal structural suspension layer 46. One or more ground plane layers may also be provided if needed. The dielectric layer 44 either alone or together with any structural suspension layer 46 provides the suspension support which holds the combination assembly 22 in position over the track of the disk 12. As stated previously, the suspension section 26 must hold the transducer-slider section 24 in place over the disk 12. The suspension section allows the pitch and roll motion to enable the transducer-slider section 24 to follow the surface of the disk 12 while preventing the yaw motion which would possibly place the transducer 25 out of the transverse position relative to the tracks.

Figure 3B:
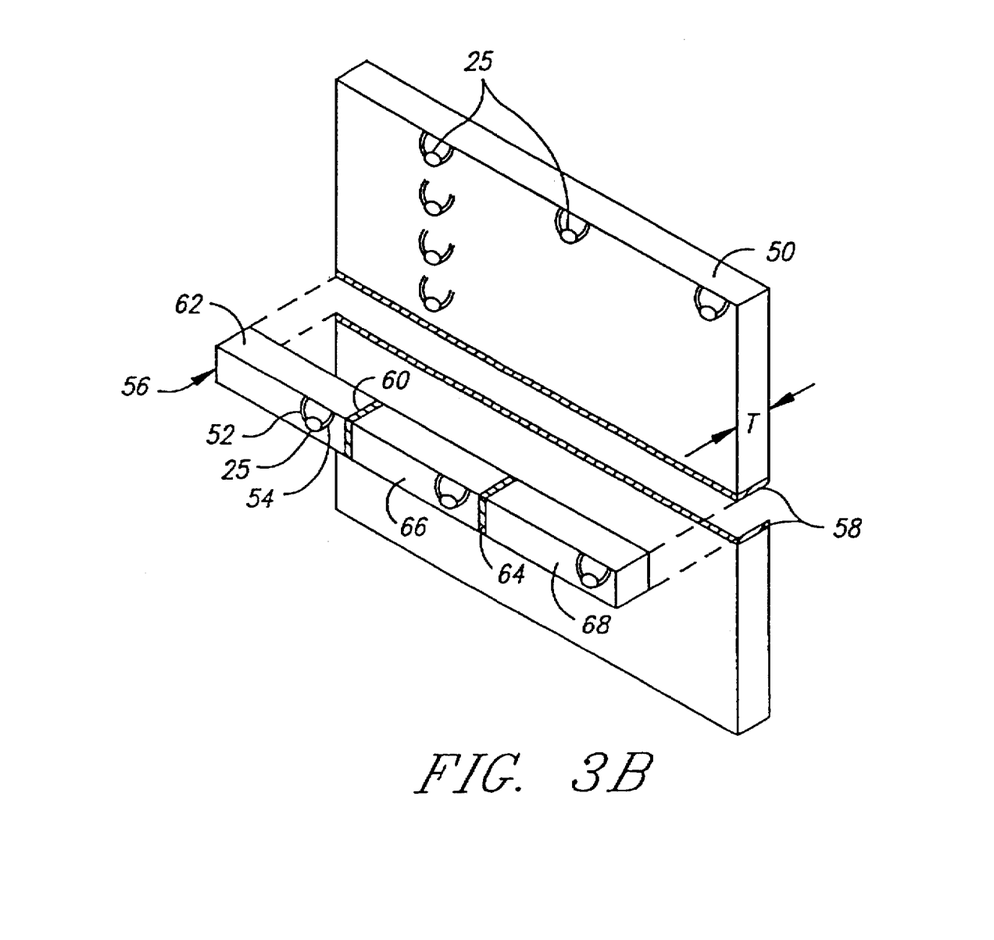
FIG. 3B is a perspective view of a substrate with a plurality of magnetic transducers formed thereon in rows and columns for use in the process to build the combination assembly as shown in FIG. 3A.
Figure 4A:
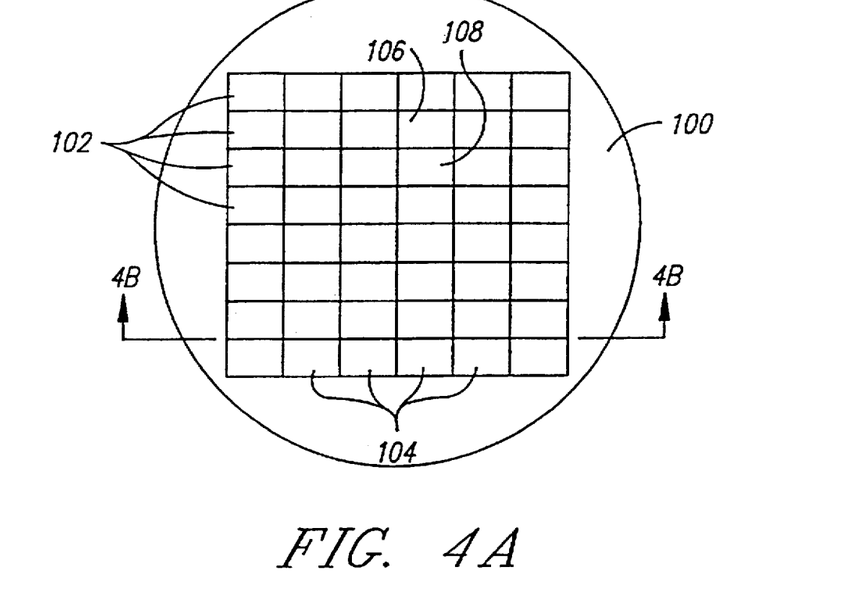
FIG. 4A is a top view of a wafer substrate showing the layout of the transducers in a row and column configuration as shown in FIG. 3B on a round wafer.

FIG. 3B shows the first steps in the method of forming the combination assembly 22 according to the first embodiment for use in the disk file configuration as FIG. 1. The batch fabrication of the thin film transducers 25 is accomplished by preparing a non-magnetic wafer substrate 50. The substrate 50 has a thickness T which, when added to the thicknesses of the deposited thin film transducer 25, will equal to the width of the suspension assembly 26 and the length of the slider 23. The transducer 25 can be the thin film inductive transducer as shown in the aforementioned U.S. Pat. No. 4,190,872 or the magnetoresistive transducer as shown in the aforementioned U.S. Pat. No. 3,975,772. The transducer 25 includes conductor leads 52 and 54 for the activation of the transducer for reading and writing to and from the magnetic media. The transducers 25 are deposited onto the substrate 50 in a row and column configuration as is shown in FIG. 4A. The row and column configuration is best described by referring to FIG. 4A before continuing the description of the process according to the present invention.

Figure 4B:
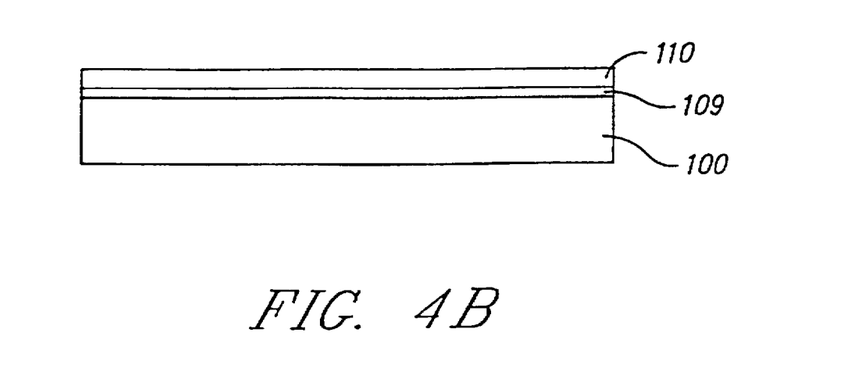
FIG. 4B is a cross sectioned view of the substrate taken along lines 4B—4B of FIG. 4A.

In FIG. 4A, a round wafer substrate 100 is shown having a plurality of the transducers 25, for instance, deposited thereon in a plurality of rows 102 and a plurality of columns 104. The wafer 100 is shown with a plurality of blocks such as block 106 15 and 108, with each block signifying one transducer. It is known that any number of rows 102 and columns 104 can be produced on a single wafer substrate 100. The number is dependent on the size of the wafer arid on the size of the individual combination assemblies. As shown in FIG. 4B, the substrate 100 includes a release layer 109 formed between the substrate 100 and a layer 110. The layer 110 in this instance represents the layers that form the transducers 25.

Thus referring back to FIG. 3B, on tile substrate 50 each transducer 25 forms one block. After the deposition of the layers that form the transducer 2S, the substrate 50 is separated into rows by sawing or otherwise dicing, one row 56 is shown separated from the substrate 50 through saw cuts 58. Later in the process, the row 56 will be separated by a cut 60 to produce a block 62 containing one transducer section 25. A further cut 64 will then completely separate the row 56 into its individual blocks 66 and 68, three blocks being illustrated in FIG. 3B per row. A saw cut 58 is shown for the cut 64. The individual blocks may also be separated by etching, machining, or dicing, for instance. In the process according to the present invention, before the layers 110 of the transducers 25 are formed on the substrate 100, a release layer 109 is deposited. The purpose of the release layer 109 will be described below with reference to FIG. 7B.

Figure 5A:
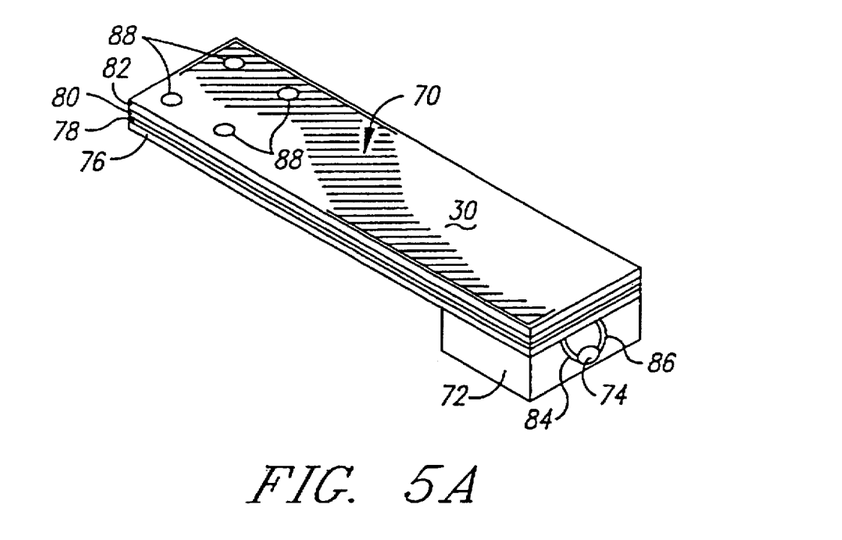
FIG. 5A is a perspective view of a second embodiment of a combination assembly according to the invention for use in the disk file shown in FIG. 2.

An enlargement of the combination assembly 30 for use with the rotary actuator 32 of the disk file of FIG. 2 is shown in FIG. 5A. A suspension section 70 is deposited over an entire section of a row as will be described later in FIG. 5B. A portion of the wafer can become a slider 72 of the combination assembly 30. While one transducer 74 is shown formed on the slider 72, it is contemplated that more than one transducer may be formed and used for operation with the track of the disk 34.

The suspension section 70 may include an insulation layer 76, a conductor layer 78, a dielectric layer 80, and a structural suspension layer 82 which could be a sputtered beryllium copper layer or a sputtered stainless steel layer. Conductor leads 84 and 86 interconnect the transducer 74 to the conductor circuitry layer 78. Electrical connection pads 88 are provided at the termination of the conductor layer 78 to interconnect with an amplifier. The amplifier could be an integrated circuit amplifier deposited together with the layers used in the suspension section 26 of FIG. 7B. The insulation layer 76 provides electrical insulation between the conductor layer 78 and the possibly electrical conductive substrate of the slider 72. The dielectric layer 80 can provide insulation if necessary for the conductive layer 78. One or more ground plane layers may also be provided if needed. The dielectric layer 80 together with any structural suspension layer 82 is basically included to provide the suspension support which holds the combination assembly 30 in position over the track of the disk 34.

Figure 5B:
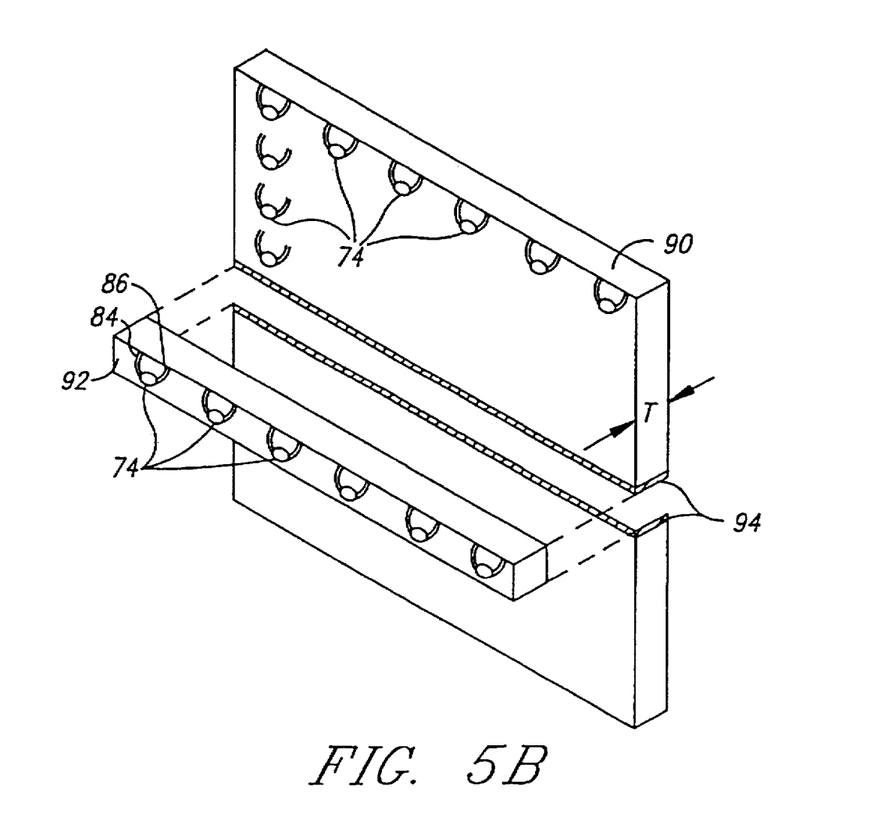
FIG. 5B is a perspective view of a substrate with a plurality of magnetic transducers formed thereon in rows and columns for use in the process to build the combination assembly as shown in FIG. 5A.

FIG. 5B shows the first steps in the method of forming the combination assembly 30 according to the first embodiment for use in the disk file configuration as FIG. 2. The batch fabrication of the thin film transducers 74 is accomplished by preparing a non-magnetic wafer substrate 90. The substrate 90 has a thickness T which, when added to the thicknesses of the deposited thin film transducers 74, will equal the lengths of the suspension section 70. Each transducer 74 can be the thin film inductive transducer as shown in the aforementioned U.S. Pat. No. 4,190,872 or the magnetoresistive transducer as shown in the aforementioned U.S. Pat. No. 3,975,772. Each transducer 74 includes the conductor leads 84 and 86 for the activation of the transducer for reading and writing to and from the magnetic media. The transducers 74 are deposited onto tire substrate 90 in a row and column configuration as is shown in FIG. 4A. The row and column configuration has been described with reference to FIG. 4A and will not be further described here.

A formation of the combination assembly 30 according to the present invention continues with the discussion of FIG. 5B. After the deposition of the transducers 74, the substrate 90 is cut into a plurality of row sections, one row section 92 being shown separated from the wafer substrate 90 by cuts 94. Each row including a plurality of the transducers 74. A further perspective view of the row section 92 is shown in FIG. 6.

Figure 6:
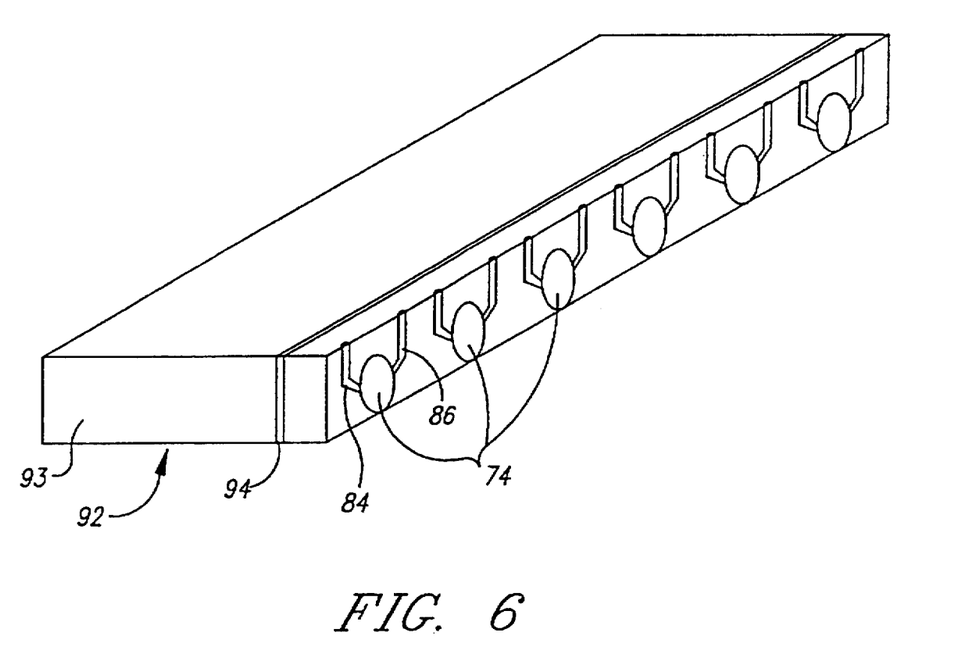
FIG. 6 is a perspective view of a row taken from the wafer as shown in FIG. 5B.

Referring to FIG. 6, in the processing of the transducers 74 and their lead conductors 84 and 86 a release layer 94 is first deposited separating the layer of the transducers 74 from the wafer substrate. The row 92 of FIG. 6 is then processed as is shown in FIG. 5A. The layers of the suspension section 70 are deposited on the top of the substrate portion of the row 92. A more detailed description of one preferred embodiment for the formation of the suspension section 70 on the row 92 and transducers 74 is given below with reference to FIGS. 7A and 7B.

Figure 7A:
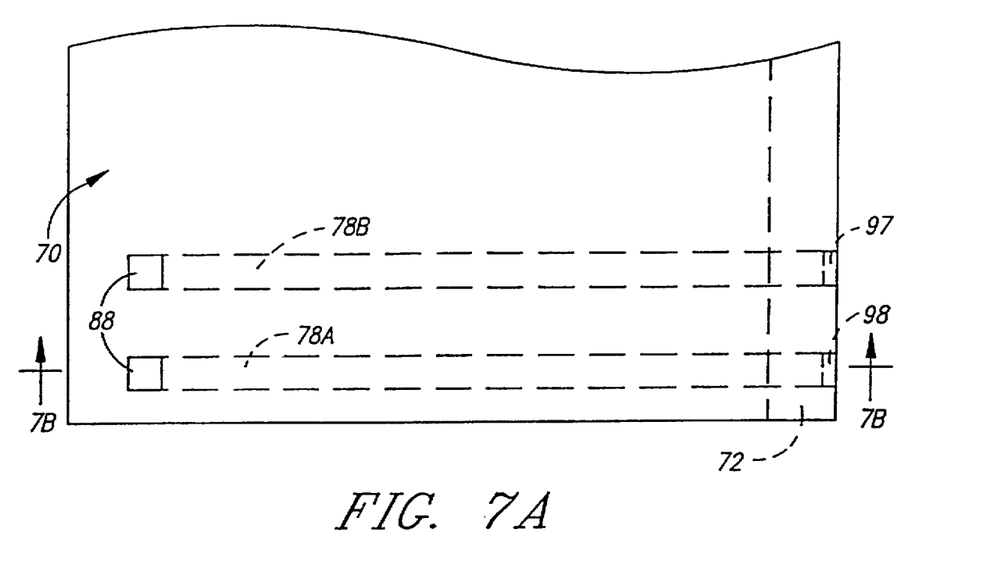
FIG. 7A is a top view of the row of FIG. 6 with the deposition of the layers forming the suspension section according to the invention; and, FIG. 7B is a cross sectioned view of the row of transducers with a suspension section taken along lines 7B—7B of FIG. 7A.
Figure 7B:
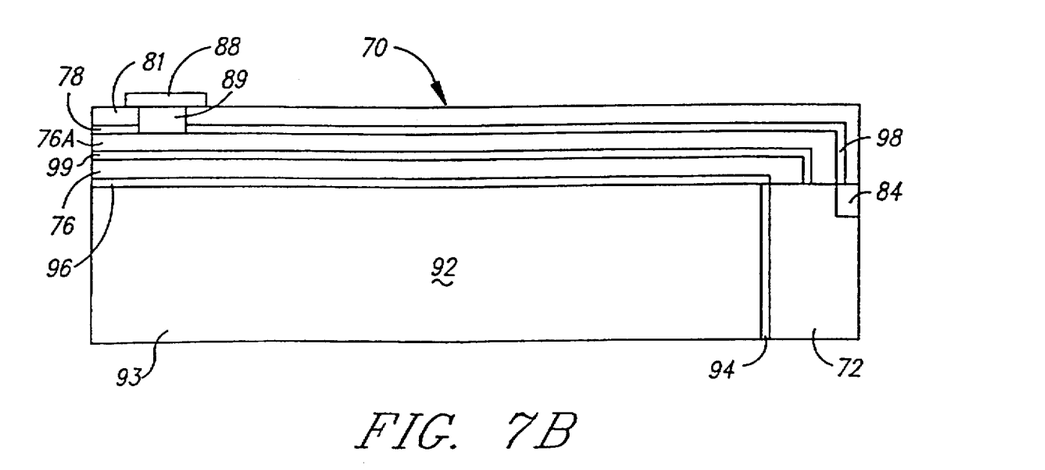

Referring now to FIGS. 7A and 7B, in this embodiment the suspension section 70 is separated from a substrate section 93 of the row section 92 by a release layer 96. The release layer 96 is of the same or similar material as used for the release layer 94. An acceptable release layer is plated nickel-iron. Other possible release layer materials include copper or chromium.

Onto the release layer 96 are formed the layers of the suspension section 70. The layers can be as shown in FIG. 5A. Studs 97 and 98 connect the conductor leads 84 and 86 to the conductors of the conductor layer. If desirable, ground planes can be included as is shown in FIG. 7B. In FIG. 7B, the insulation layer 76 is deposited onto the release layer 96. A first ground plane layer 99 can be deposited on the insulation layer 76. Another insulation layer 76A is then deposited on the ground plane layer 99. The conductor layer 78 is then deposited, it being evident that the conductor layer 78 includes a plurality of conductors, at least two for each transducer such as conductors 78A and 78B of FIG. 7A. A suspension support layer 81 provides the leaf spring-like support for the combination assembly and can comprise the layers 80 and 82 of FIG. 5A. A further ground plane (not shown) can be deposited on top of another insulation layer deposited on the conductor layer 78. The top ground plane provides greater isolation and symmetric stress due to thermal mismatches and both are desired in certain applications. A stud 89 connects the conductors of the conductive layer 78 to the connection pads 88 of FIG. 5A, only two are shown in FIG. 7A.

Note that the suspension section 70 and the transducer section 72 overlap and bond to each other without an interposed release layer. This step provides a bend of thick material. Utilizing the release layers 94 and 96 permits removing the substrate 93 of the row section 92 from the combination assembly, leaving only the suspension section 70 and any support layers for the transducers 72 with their associated leads. An extremely lightweight suspension system is thereby produced complete with transducers.

Removal of the release layer, nickel-iron for instance, is readily accomplished using ammonia persulfate, for instance, which does not attack the alumina generally used in the process for providing the transducers.

Stiffening of the suspension system can be accomplished by varying the thickness profile of the suspension section 70 for instance. In the illustration in FIGS. 7a and 7B, the suspension section 70 is uniform in thickness, but, in some applications, it is required that the profile be varied to accommodate the specific application. Anisotropic stiffness can be accomplished through the use of corrugated portions along the length of the suspension section 70, for instance.

Figure 8:
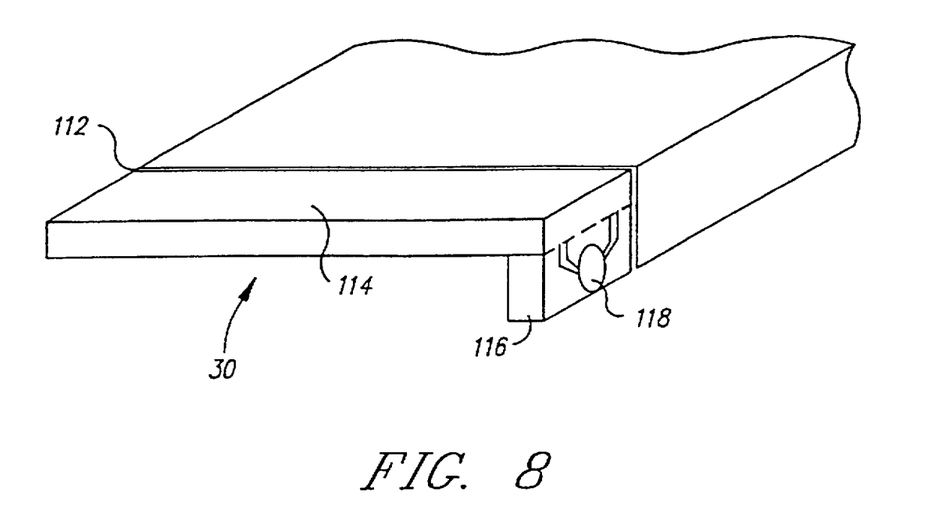
FIG. 8 is a side view illustrating a row of the combination assembly when the substrate has been removed from the suspension and transducer elements of FIGS. 7A and B.

FIG. 8 shows a completed row section with the unwanted and excess substrate portions removed. A saw cut 112 will separate one combination assembly 30 from the row section leaving the combination assembly with its own suspension section 114, its own slider portion 116, and its own transducer 118. Further cuts will then separate the remaining combination assemblies. Once the combination assembly has been so manufactured, its incorporation into a rigid disk reader is easily accomplished and is obvious to those of ordinary skill in the art. One such disk reader is illustrated in U.S. Pat. No. 3,849,800.

In an embodiment of the suspension to provide for placement of the transducer adjacent to the media only when desired, the suspension has an active material device formed thereon. This active material device may be one of several devices known to those in the art including, but not limited to, a piezoelectric device, an electrostrictor device, or a heater. The active material device controls the suspension itself so that contact by the read/write transducer is easily effected. Still other embodiments utilize the suspension for containing the electrical strip lines for communicating with the transducer. By varying the thickness of the suspension, selective stiffening of the suspension is easily accomplished. This attribute permits the suspension to be modified to fit particular applications.

Another approach to the removal of the substrate of a row section including the deposited transducers is through grinding or otherwise etching away the substrate. In this approach using FIG. 7B as an example, the release layers 94 and 96 are not used, rather the excess substrate 93 is removed through grinding or other suitable ablation process. Through this process, a portion of the substrate can remain as a base support, a slider section, for the transducers 72. This method could be especially useful if there is a requirement that the transducers be suspended by a cushion of air to fly above the magnetic media of the disk.

The approach described herein allows for production of suspension-slider-transducer combination assemblies having very high yield rates. Adjacent systems can be separated by patterning the thin film depositions through photolithography, thus eliminating the usual saw kerf allowances. Similarly the throat height of the thin film heads is defined lithographically since only the thickness of the suspension system material is required to be milled or etched at the desired length.

While the invention has been particularly shown and described with reference to preferred embodiments thereof, it will be understood by those skilled in the art that various changes in form and detail may be made therein without departing from the spirit and scope of the invention. For instance, a transducer may be produced onto the wafer such as is described in U.S. Pat. No. 4,190,872, assigned to the assignee of the present invention. The wafer may be made of material such as is the subject matter of the Jacobs U.S. Pat. No. 4,251,841. The suspension section according to the preferred embodiments could be any of several configurations such as a dual layer of a polyimide material and a metal layer formed thereon to provide sufficient resiliency and stiffness as required by a suspension assembly. It should be noted that the suspension assembly could be produced in a single layer if the correct thickness and stiffness were obtained in the single layer. It is also well understood that many electrically conductive materials are available to form the conductive circuitry and the transducer leads. Copper or gold is the preferred material but many others are available as is well known in the art. While air bearing surface sliders are discussed herein, the present invention also includes contact recording sliders wherein the air bearing surface of the slider is any suitable surface that can be placed in contact with the media during operation. Horizontal transducers are shown in the preferred embodiment. However this invention is also applicable to vertical transducers wherein the slider-suspension combination is produced by the disclosed process without the transducer. The vertical style transducer is produced separately and then bonded to the slider-suspension combination. The invention claimed herein is set forth in the following claims.

What is claimed is:

1. A method for processing a combination transducer and suspension assembly comprising the steps of:
   providing a wafer substrate having a thickness equal to a desired suspension length;
   forming a first release layer on a major surface of said substrate;
   forming a support layer on said first release layer;
   forming a plurality of thin film transducers with transducer conductor leads on said support layer in a row and column pattern;
   separating a row section from said wafer substrate, each row section having a plurality of said formed transducers, one from each said column;
   forming a second release layer on a separated side of said separated row section adjacent said major surface, said second release layer extending from said first release layer to an opposing end of said separated row section;
   forming a suspension section by depositing at least one thin film layer of a resilient material on said second release layer;
   forming electrically conductive members extending from said transducer to said opposing end of said suspension layer;
   dissolving said first and second release layers; and
   separating said row section into individual transducers, each said transducer having an associated portion of said suspension section.

2. A method according to claim 1 wherein the step of forming electrically conductive members includes the step of depositing a thin film layer of an electrical conductor material to provide said electrical connecting members formed in at least one of said layers of deposited material of said suspension section and extending from said opposing end of said suspension section to said transducer conductor leads.

3. A method according to claim 2 further including the step of, after the step of forming said suspension section forming an integrated circuit amplifier on said suspension adjacent to said opposing end and electrically connected to said electrical connecting members.

4. A method according to claim 1 further comprising the step of, prior to dissolving said first and second release layers forming an active material device on said suspension layer.

5. A method for processing a combination transducer and suspension assembly comprising the steps of:
   providing a wafer substrate having a thickness equal to a desired suspension length;
   forming a plurality of transducers and transducer conductor leads on a major surface of said wafer substrate in a row and column pattern;
   separating a row section from said wafer substrate, with each row section having a plurality of said transducers, one from each column;
   forming a suspension section on a separated side of said separated row section by depositing at least one layer of a resilient material on said separated side;
   forming electrically conductive members extending from said transducer to an opposing end of said suspension section layer;
   removing undesired portions of the wafer substrate; and
   separating said row section into individual transducers, each said transducer having an associated portion of said suspension section.

6. A method according to claim 5 wherein the step of forming electrically conductive members includes the step of depositing a thin film layer of an electrical conductor material to provide electrical connecting members formed in at least one of said layers of deposited material of said suspension section and extending from said opposing end of said suspension section to said transducer conductor leads so as to electrically couple the connecting members to said transducer.

7. A method according to claim 6 further including, after the step of forming said suspension section, forming an integrated circuit amplifier on said suspension section adjacent to said opposing end and electrically connected to said electrical connecting members.

8. A method according to claim 5 wherein the step of removing undesired portions of the wafer substrate leaves a slider support section for each said transducer.

9. A method of making an integrated reed suspension and transducer comprising the steps of:
providing a substrate which has a substantially flat surface;
constructing said transducer by forming thin film layers on said flat surface;
forming the substrate with a substrate edge and the transducer with a transducer edge so that the substrate edge is adjacent said flat surface and is substantially coplanar with respect to said transducer edge;
forming said reed suspension on the substrate edge and the transducer edge; and
removing at least a portion of said substrate.

10. A method of making a magnetic disk drive including the method of making the integrated reed suspension and transducer as claimed in claim 9, the method of making the magnetic disk drive comprising:
providing a magnetic disk supported by a spindle and providing means for rotating the spindle and the magnetic disk supported thereby;
providing an actuator having an actuator arm; and
mounting the integrated reed suspension and transducer on the actuator arm so that the transducer can be selectively positioned adjacent circular tracks on the magnetic disk.

11. A method as claimed in claim 9 including the step of:
providing the substrate with a thickness which is substantially equal to a length of the reed suspension.

12. A method as claimed in claim 9 including the steps of:
providing a wafer substrate which comprises a plurality of said substrates;
constructing rows and columns of said transducers on said substrate wafer;
dicing the substrate wafer into discrete rows of transducers so as to provide a row of substrate edges which comprises a plurality of said substrate edges and so as to provide a row of transducer edges which comprises a plurality of said transducer edges;
forming a row of reed suspensions which comprises a plurality of said reed suspensions on the row of substrate edges and on the row of transducer edges; and
dicing the row of substrates into said substrates so that each substrate supports said integrated reed suspension and transducer.

13. A method as claimed in claim 12 including the step of:
providing the substrate with a thickness which is substantially equal to a length of the reed suspension.

14. A method as claimed in claim 9 including the steps of:
before constructing said transducer forming a transducer release layer on the flat surface of the substrate and then constructing the transducer on the transducer release layer;
before forming said reed suspension forming a suspension release layer on the substrate edge so as to join the transducer release layer and then forming the reed suspension on the suspension release layer; and dissolving the suspension release layer and the transducer release layer to separate the reed suspension and transducer from the substrate.

15. A method as claimed in claim 9 including the steps of:
the step of constructing the transducer includes depositing at least one thin film layer on the transducer release layer for forming transducer leads which extend to said transducer edge; and
the step of forming the reed suspension includes depositing at least one thin film layer on the suspension layer for forming conductor leads which extend along the reed suspension and are connected to said transducer leads at said transducer edge.

16. A method as claimed in claim 15 including the steps of:
providing a wafer substrate which comprises a plurality of said substrates;
constructing rows and columns of said transducers on said substrate wafer;
dicing the substrate wafer into discrete rows of transducers so as to provide a row of substrate edges which comprises a plurality of said substrate edges and so as to provide a row of transducer edges which comprises a plurality of said transducer edges;
forming a row of reed suspensions which comprises a plurality of said reed suspensions on the row of substrate edges and on the row of transducer edges; and
dicing the row of substrates into said substrates so that each substrate supports said integrated reed suspension and transducer.

17. A method as claimed in claim 15 including the step of:
the step of forming the conductor leads which are connected to the transducer leads comprising forming studs which interconnect the conductor leads to the transducer leads.

18. A method as claimed in claim 15 including the step of:
forming contacts in the reed suspension, each contact having an end embedded in the reed suspension and in contact with a respective conductor lead and an exposed end which is exposed to an outside environment.

19. A method as claimed in claim 18 including the step of:
mounting an integrated circuit on the reed suspension in contact with the exposed ends of said contacts.

20. A method as claimed in claim 9 including the steps of:
the step of forming the reed suspension comprises forming a plurality of perpendicular thin film layers which are substantially perpendicular to the thin film layers of the transducer with an end portion of the perpendicular thin film layers overlaying and mechanically connected to said transducer edge.

21. A method as claimed in claim 20 including the step of:
forming one or more of the perpendicular thin film layers as a support layer for supporting the transducer.

22. A method as claimed in claim 20 including the steps of:
the step of constructing the transducer includes depositing at least one thin film layer on the transducer release layer for forming transducer leads which extend to said transducer edge; and
the step of forming the reed suspension includes depositing at least one thin film layer on the suspension layer for forming conductor leads which extend along the reed suspension and are connected to said transducer leads at said transducer edge.

23. A method as claimed in claim 22 including the steps of:

forming a first one of the perpendicular thin film layers as an insulation support layer on the substrate;

forming a second one of the perpendicular thin film layers as said conductor leads on said insulation support layer; and forming a third one of the perpendicular thin film layers as an insulation support layer on said conductor leads.

24. A method as claimed in claim 22 including the steps of:

before constructing said transducer forming a transducer release layer on the flat surface of the substrate and then constructing the transducer on the transducer release layer;

before forming said reed suspension forming a suspension release layer on the substrate edge so as to join the transducer release layer and then forming the reed suspension on the suspension release layer; and dissolving the suspension release layer and the transducer release layer to separate the reed suspension and transducer from the substrate.

25. A method as claimed in claim 24 including the steps of:

providing a wafer substrate which comprises a plurality of said substrates;

constructing rows and columns of said transducers on said substrate wafer;

dicing the substrate wafer into discrete rows of transducers so as to provide a row of substrate edges which comprises a plurality of said substrate edges and so as to provide a row of transducer edges which comprises a plurality of said transducer edges;

forming a row of reed suspensions which comprises a plurality of said reed suspensions on the row of substrate edges and on the row of transducer edges; and dicing the row of substrates into said substrates so that each substrate supports said integrated reed suspension and transducer.

26. A method as claimed in claim 25 including the step of:

providing the substrate with a thickness which is substantially equal to a length of the reed suspension.

27. A method of making a magnetic disk drive including the method of making the integrated reed suspension and transducer as claimed in claim 24, the method of making the magnetic disk drive comprising:

providing a magnetic disk supported by a spindle and providing means for rotating the spindle and the magnetic disk supported thereby;

providing an actuator having an actuator arm; and mounting the integrated reed suspension and transducer on the actuator arm so that the transducer can be selectively positioned adjacent circular tracks on the magnetic disk.

28. A method as claimed in claim 24 including the steps of:

before constructing said transducer forming a transducer release layer on the flat surface of the substrate and then constructing the transducer on the transducer release layer;

before forming said suspension forming a suspension release layer on the substrate edge so as to join the transducer release layer and then forming the reed suspension on the suspension release layer; and dissolving the suspension release layer and the transducer release layer to separate the reed suspension and transducer from the substrate.

29. A method as claimed in claim 28 including the steps of:

forming a first one of the perpendicular thin film layers as an insulation support layer on the substrate;

forming a second one of the perpendicular thin film layers as said conductor leads on said insulation support layer; and forming a third one of the perpendicular thin film layers as an insulation support layer on said conductor leads.

30. A method as claimed in claim 29 including the step of:

mounting an integrated circuit on the reed suspension in contact with the exposed ends of said contacts.

31. A method as claimed in claim 30 including the step of:

the step of forming the conductor leads which are connected to the transducer leads comprising forming studs which interconnect the conductor leads to the transducer leads.

32. A method of making integrated reed suspension and transducer combinations comprising:

providing a wafer substrate which has a substantially flat surface;

depositing a plurality of thin film layers on said flat surface to form a plurality of transducer systems which are arranged in at least one row;

dicing the wafer substrate to provide at least one discrete row of transducer systems on a substrate section, the discrete row of transducer systems comprising said plurality of transducer systems which are arranged in said at least one row, said dicing providing each of the discrete row of transducer systems and the substrate section with a respective cut edge wherein the cut edges of the discrete row of transducer systems and the substrate section are substantially coplanar with respect to one another;

depositing at least one thin film layer on the cut edges of the discrete row of transducer systems and the substrate section to form a reed suspension for each transducer system in said discrete row of transducer systems; and dicing said substrate section and said discrete row of transducer systems into individual reed suspension and transducer system combinations.

33. A method as claimed in claim 32 including the step of removing at least a portion of said substrate section.

34. A method of making a magnetic disk drive including the method of making integrated reed suspension and transducer combinations as claimed in claim 33, the method of making the magnetic disk drive comprising:

providing a magnetic disk supported by a spindle and providing means for rotating the spindle and the magnetic disk supported thereby;

providing an actuator having an actuator arm, and mounting one of the integrated reed suspension and transducer combinations on the actuator arm so that the transducer can be selectively positioned adjacent circular tracks on the magnetic disk.

35. A method as claimed in claim 33 wherein the step of depositing a plurality of thin film layers includes depositing a thin film layer for forming transducer leads for said plurality of transducer system.

36. A method as claimed in claim 33 including the steps of:

the step of constructing the transducer systems includes depositing at least one thin film on the transducer release layer to form transducer leads which extend to said edge of the discrete row of transducer systems; and the step of forming a reed suspension for each transducer system includes depositing at least one thin film layer on the suspension release layer for forming conductor leads which extend along each reed suspension and are connected to said transducer leads at said edge of the discrete row of transducer systems.

37. A method as claimed in claim 33 including the steps of:

the step of forming a reed suspension for each transducer system comprises forming a plurality of perpendicular thin film layers which are substantially perpendicular to the thin film layers of the transducer systems with an end portion of the perpendicular thin film layers overlying and mechanically connected to said cut edge of the discrete row of transducer systems.

38. A method as claimed in claim 33 including the step of:

providing the wafer substrate with a thickness which is substantially equal to a length of the reed suspension.

39. A method as claimed in claim 33 including the step of:

the step of forming the conductor leads which are connected to the transducer leads comprising forming studs which interconnect the conductor leads to the transducer leads.

40. A method as claimed in claim 39 including the step of:

forming contacts in each reed suspension, each contact having an end embedded in a respective reed suspension and in contact with a respective conductor lead and an exposed end which is exposed to an outside environment.

41. A method as claimed in claim 40 including the step of:

mounting an integrated circuit on each reed suspension in contact with the exposed ends of said contacts.

42. A method as claimed in claim 33 including the steps of:

forming a first one of the perpendicular thin film layers as an insulation support layer on the water substrate;

forming a second one of the perpendicular thin film layers as said conductor leads on said insulation support layer; and forming a third one of the perpendicular thin film layers as an insulation support layer on said conductor leads.

43. A method as claimed in claim 33 including the steps of:

before constructing said transducer systems forming a transducer release layer on said flat surface of the wafer substrate and then forming said transducer systems on the transducer release layer;

before forming said reed suspension for each transducer system forming a suspension release layer only on the edge of the substrate section so as to join the suspension release layer with the transducer release layer and then forming the reed suspension for each transducer system on the suspension release layer; and dissolving the suspension release layer and the transducer release layer to separate the reed suspension and transducer system combinations from the substrate section.

44. A method as claimed in claim 43 including the steps of:

the step of constructing the transducer systems includes depositing at least one thin film on the transducer release layer to form transducer leads which extend to said edge of the discrete row of transducer systems; and the step of forming a reed suspension for each transducer system includes depositing at least one thin film layer on the suspension release layer for forming conductor leads which extend along each reed suspension and are connected to said transducer leads at said edge of the discrete row of transducer systems.

45. A method as claimed in claim 44 including the steps of:

the step of forming a reed suspension for each transducer system comprises forming a plurality of perpendicular thin film layers which are substantially perpendicular to the thin film layers of the transducer systems with an end portion of the perpendicular thin film layers overlying and mechanically connected to said cut edge of the discrete row of transducer systems.

46. A method as claimed in claim 45 including the step of:

providing the wafer substrate with a thickness which is substantially equal to a length of the reed suspension.

47. A method as claimed in claim 46 including the step of:

the step of forming the conductor leads which are connected to the transducer leads comprising forming studs which interconnect the conductor leads to the transducer leads.

48. A method as claimed in claim 47 including the step of:

forming contacts in each reed suspension, each contact having an end embedded in a respective reed suspension and in contact with a respective conductor lead and an exposed end which is exposed to an outside environment.

49. A method as claimed in claim 48 including the steps of:

forming a first one of the perpendicular thin film layers as an insulation support layer on the wafer substrate;

forming a second one of the perpendicular thin film layers as said conductor leads on said insulation support layer; and forming a third one of the perpendicular thin film layers as an insulation support layer on said conductor leads.

50. A method of making a magnetic disk drive including the method of making integrated reed suspension and transducer combinations as claimed in claim 49, the method of making the magnetic disk drive comprising:

providing a magnetic disk supported by a spindle and providing means for rotating the spindle and the magnetic disk supported thereby;

providing an actuator having an actuator arm; and mounting one of the integrated reed suspension and transducer combinations on the actuator arm so that the transducer can be selectively positioned adjacent circular tracks on the magnetic disk.

51. A method as claimed in claim 49 including the step of:

mounting an integrated circuit on each reed suspension in contact with the exposed ends of said contacts.

* * * * *